US010377181B2

(12) United States Patent
Shimomura (10) Patent No.: US 10,377,181 B2
(45) Date of Patent: Aug. 13, 2019

(54) PNEUMATIC TIRE (71) Applicant: TOYO TIRE & RUBBER CO., LTD., Osaka-shi, Osaka (JP)

(72) Inventor: Kazuo Shimomura, Osaka (JP)

(73) Assignee: TOYO TIRE CORPORATION, Itami-shi (JP)

(*) Notice: Subject to any disclaimer, the term of this patent is extended or adjusted under 35 U.S.C. 154(b) by 759 days.

(21) Appl. No.: 14/834,827

(22) Filed: Aug. 25, 2015

(65) Prior Publication Data
US 2016/0059637 A1  Mar. 3, 2016

(30) Foreign Application Priority Data

Aug. 26, 2014 (JP) ................. 2014-171428

(51) Int. Cl.
*B60C 11/01* (2006.01)
*B60C 15/00* (2006.01)
*B60C 9/28* (2006.01)
*B60C 9/20* (2006.01)

(52) U.S. Cl.
CPC .............. *B60C 11/01* (2013.01); *B60C 9/28* (2013.01); *B60C 15/0036* (2013.01); *B60C 2009/2038* (2013.01); *B60C 2011/013* (2013.01)

(58) Field of Classification Search
CPC ............. B60C 2011/013; B60C 13/02; B60C 15/0036; B60C 15/0045; B60C 15/0009; B60C 2015/009; B60C 2015/0696; B60C 11/01
USPC ........................... 152/455–456, 554
See application file for complete search history.

(56) References Cited

U.S. PATENT DOCUMENTS

2008/0223495 A1   9/2008  Ikeda et al.
2009/0005481 A1   1/2009  Ishida et al.
2013/0118663 A1*  5/2013  Kishizoe ............... B60C 11/12
                                                  152/209.18
(Continued)

FOREIGN PATENT DOCUMENTS

CN      101264720 A    9/2008
CN      101333308 A   12/2008
(Continued)

OTHER PUBLICATIONS

Machine Translation: JP-2011057053-A; Horiuchi, Kenji; (Year: 2018).*

(Continued)

*Primary Examiner* — Robert C Dye
*Assistant Examiner* — Kendra Ly
(74) *Attorney, Agent, or Firm* — Westerman, Hattori, Daniels & Adrian, LLP (57) ABSTRACT In a pneumatic tire, a tread rubber includes a recessed portion extending along a tire-circumferential direction, the recessed portion being placed at a position of a tire-outer surface superposed on an end of the belt portion or at a position of a tire-outer surface on an outer side in a tire-width direction than the former position of the tire-outer surface, an outer wound-up portion is placed closer to a belt portion than an inner wound-up portion, the outer wound-up portion is separated from the belt portion to prevent the outer wound-up portion from being superposed on the belt portion, and the outer wound-up portion is superposed on the recessed portion.

6 Claims, 10 Drawing Sheets

(56) References Cited

U.S. PATENT DOCUMENTS

2015/0013869 A1 1/2015 Yukawa

FOREIGN PATENT DOCUMENTS

| | | | | | |
|---|---|---|---|---|---|
| GB | 1067773 | A | * | 5/1967 | ............... B60C 9/20 |
| JP | 60038211 | A | * | 2/1985 | ............. B60C 11/01 |
| JP | 05178013 | A | * | 7/1993 | |
| JP | 06143915 | A | * | 5/1994 | |
| JP | 2007-83914 | A | | 4/2007 | |
| JP | 2007083914 | A | * | 4/2007 | |
| JP | 2008-279796 | A | | 11/2008 | |
| JP | 2009-214628 | A | | 9/2009 | |
| JP | 2011-57053 | A | | 3/2011 | |
| JP | 2011057053 | A | * | 3/2011 | |
| WO | 2013/129351 | A1 | | 9/2013 | |

OTHER PUBLICATIONS

Machine Translation: JP05178013A; Tsukada, Shuichi; (Year: 2018).*
Machine Translation: JP-06143915-A; Sugihara, Hideaki; (Year: 2018).*
Machine Translation: JP-2007083914-A; Daishiyou, Koujirou; (Year: 2018).*
Machine Translation: JP-60038211-A; Kakumaru, Kazuo; (Year: 2019).*
Office Action dated Dec. 2, 2016, issued in counterpart Chinese Patent Application No. 201510527342.3, with English translation. (14 pages).
Office Action dated Apr. 27, 2017, issued in counterpart Chinese Application No. 201510527342.3, with English transaltion. (15 pages).
Office Action dated Feb. 15, 2018, issued in counterpart German Application No. 102015113917.0, with English translation. (8 pages).

* cited by examiner

| | Example 1 | Example 2 | Example 3 | Example 4 | Comparative example 1 | Comparative example 2 | Comparative example 3 | Comparative example 4 |
|---|---|---|---|---|---|---|---|---|
| End of inner wound-up portion 52a | Position superposed on projecting portion 63 | Position between outer end 63b of projecting portion and outer end 64 of tread rubber | Position superposed on outer end 64 of tread rubber | Position superposed on recessed portion 62 | Position superposed on projecting portion 63 | Position superposed on projecting portion 63 | Position on outer side than position superposed on outer end 64 of tread rubber | Position superposed on recessed portion 62 |
| | Figs. 2 and 3 | Fig. 6 | Fig. 7 | Fig. 8 | Figs. 2 and 3 | Figs. 2 and 3 | Fig. 11 | Fig. 12 |
| End of outer wound-up portion 53a | Position superposed on recessed portion 62 | Position superposed on recessed portion 62 | Position superposed on recessed portion 62 | Position superposed on recessed portion 62 | Position superposed on projecting portion 63 | Position superposed on belt portion 7 | Position superposed on recessed portion 62 | Position superposed on recessed portion 62 |
| | Figs. 4 and 5 | Figs. 4 and 5 | Figs. 4 and 5 | Figs. 4 and 5 | Fig. 9 | Fig. 10 | Figs. 4 and 5 | Figs. 4 and 5 |
| Symmetry | Asymmetry | Asymmetry | Asymmetry | Asymmetry | Symmetric | Asymmetry | Asymmetry | Symmetric |
| Ride comfort performance | 100 | 102 | 103 | 99 | 100 | 94 | 102 | 96 |
| Steering stability performance | 104 | 102 | 101 | 102 | 100 | 106 | 98 | 103 |

PNEUMATIC TIRE

CROSS REFERENCE TO RELATED APPLICATIONS

This application claims the benefit of priority under 35 USC 119 of Japanese application no. 2014-171428, filed on Aug. 26, 2014, which is incorporated herein by reference.

BACKGROUND OF THE INVENTION

Field of the Invention

The present invention relates to a pneumatic tire having a carcass layer bridged between a pair of beads.

Description of the Related Art

Conventionally, as a pneumatic tire, there is known one having a pair of annularly formed beads and a carcass layer bridged between the pair of beads (e.g., JP-A-2011-57053). The carcass layer is wound up from an inner side toward an outer side in a tire-width direction such that the carcass layer envelops the beads.

Meanwhile, generally, due to a camber angle of the vehicle, bending-easiness of an inner side portion when the tire is mounted on a vehicle influences envelope characteristics when the vehicle runs straightly, i.e., ride comfort performance. Further, a large force is applied to an outer side portion (when the tire is mounted on the vehicle) of an outer wheel during cornering. Therefore, bending-hardness of the outer side portion when the tire is mounted on the vehicle influences steering stability performance during cornering.

On the other hand, in the pneumatic tire of JP-A-2011-57053, a wound-up portion of the carcass layer placed on the outer side when the tire is mounted on the vehicle is placed further away from a belt portion than the wound-up portion of the carcass layer placed on the inner side when the tire is mounted on the vehicle. According to this, since rigidity of the inner side portion when the tire is mounted on the vehicle becomes high, ride comfort performance is deteriorated. Further, since rigidity of the outer side portion when the tire is mounted on the vehicle becomes low, steering stability performance is deteriorated.

SUMMARY OF THE INVENTION

In view of the above-described circumstances, it is an object of the present invention to provide a pneumatic tire capable of enhancing steering stability performance without deteriorating ride comfort performance.

There is provided a pneumatic tire which includes:

a pair of beads formed annularly;

a carcass layer bridged between the pair of beads;

a tread rubber placed on an outer peripheral side of the carcass layer to configure a ground contact surface; and a belt portion placed on the outer peripheral side of the carcass layer and on an inner peripheral side of the tread rubber, wherein the carcass layer includes an inner wound-up portion which is placed on an inner side when the tire is mounted on a vehicle, and which is wound up from an inner side toward an outer side around the beads in a tire-width direction, and an outer wound-up portion which is placed on an outer side when the when the tire is mounted on the vehicle, and which is wound up from the inner side toward the outer side around the beads in the tire-width direction, the tread rubber includes a recessed portion extending along a tire-circumferential direction, the recessed portion being placed at a position of a tire-outer surface superposed on an end of the belt portion or at a position of a tire-outer surface on an outer side in a tire-width direction than the former position of the tire-outer surface, the outer wound-up portion is placed closer to the belt portion than the inner wound-up portion, the outer wound-up portion is separated from the belt portion to prevent the outer wound-up portion from being superposed on the belt portion, and the outer wound-up portion is superposed on the recessed portion.

According to the pneumatic tire, the tread rubber includes the recessed portion which extends in the tire-circumferential direction and which is placed at the position of the tire-outer surface superposed on the end of the belt portion or at the position of the tire-outer surface on the outer side in the tire-width direction than the former position. This configuration reduces strength of a tread portion in the vicinity of the recessed portion.

Therefore, when the tire climbs over a small projection on a road surface for example, vibrations and the like are easily absorbed since the tire easily deforms and bends around the recessed portion. As a result, it is possible to enhance envelope characteristics (characteristics of the tread portion for enveloping a small projection on a road surface when the tire climbs over the small projection). Therefore, the ride comfort performance can be enhanced.

Further, the outer wound-up portion is placed closer to the belt portion than the inner wound-up portion. According to this, since rigidity of the inner side portion when the tire is mounted on the vehicle becomes low, the ride comfort performance can be enhanced, and since rigidity of the outer side portion when the tire is mounted on the vehicle becomes high, the steering stability performance can be enhanced.

Further, since the outer wound-up portion is separated from the belt portion, the outer wound-up portion is prevented from being superposed on the belt portion. According to this, possible to prevent vibration and the like of the belt portion from propagating directly to the outer wound-up portion. Therefore, the ride comfort performance can be enhanced.

Further, the outer wound-up portion is superposed on the recessed portion. This configuration prevents rigidity of the recessed portion placed on the outer side when the tire is mounted on the vehicle from lowering more than necessary. Therefore, the steering stability performance can be enhanced. As described above, according to the pneumatic tire, it is possible to enhance the steering stability performance without deteriorating the ride comfort performance.

Also the pneumatic tire may have a configuration in which:

the inner wound-up portion is placed such that the end of the inner wound-up portion is located between an outer end of the recessed portion in the tire-width direction and the outer end of the tread rubber in the tire-width direction, to prevent the inner wound-up portion from being superposed on the recessed portion and to make the inner wound-up portion be superposed on an outer end of the tread rubber in the tire-width direction.

According to this configuration, the inner wound-up portion is placed between the outer end of the tread rubber in the tire-width direction and the outer end of the recessed portion in the tire-width direction. This arrangement prevents the inner wound-up portion from being superposed on the recessed portion. Accordingly, rigidity of the recessed portion is prevented from increasing. Therefore, the ride comfort performance is prevented from being deteriorated.

A force is applied to the inner side portion (when the tire is mounted on the vehicle) of an inner wheel during cornering. On the other hand, since the inner wound-up portion is superposed on the outer end of the tread rubber in the tire-width direction, rigidity of the inner side portion when the tire is mounted on the vehicle is prevented from lowering more than necessary. This can inhibit the steering stability performance from being deteriorated.

Also the pneumatic tire may have a configuration in which:

the tread rubber includes a projecting portion which is adjacent to an outer side of the recessed portion in the tire-width direction and which extends in the tire-circumferential direction, and the inner wound-up portion is superposed on the projecting portion.

According to this configuration, the tread rubber includes the projecting portion which is adjacent to the outer side of the recessed portion in the tire-width direction and which extends in the tire-circumferential direction. According to this, since the strength of the projecting portion is large, the recessed portion easily deforms and bends more than necessary (easily bends and deforms), for example. On the other hand, since the inner wound-up portion is superposed on the projecting portion, the recessed portion is inhibited from deforming and bending more than necessary.

As described above, the pneumatic tire of the present invention has an effect that the steering stability performance is enhanced without deteriorating the ride comfort performance.

DETAILED DESCRIPTION OF THE PREFERRED EMBODIMENTS

One embodiment of a pneumatic tire will be described below with reference to FIGS. 1 to 5. In the drawings (including FIGS. 6 to 12), a dimensional ratio of the drawings and an actual dimensional ratio do not always correspond with each other.

Figure 1:
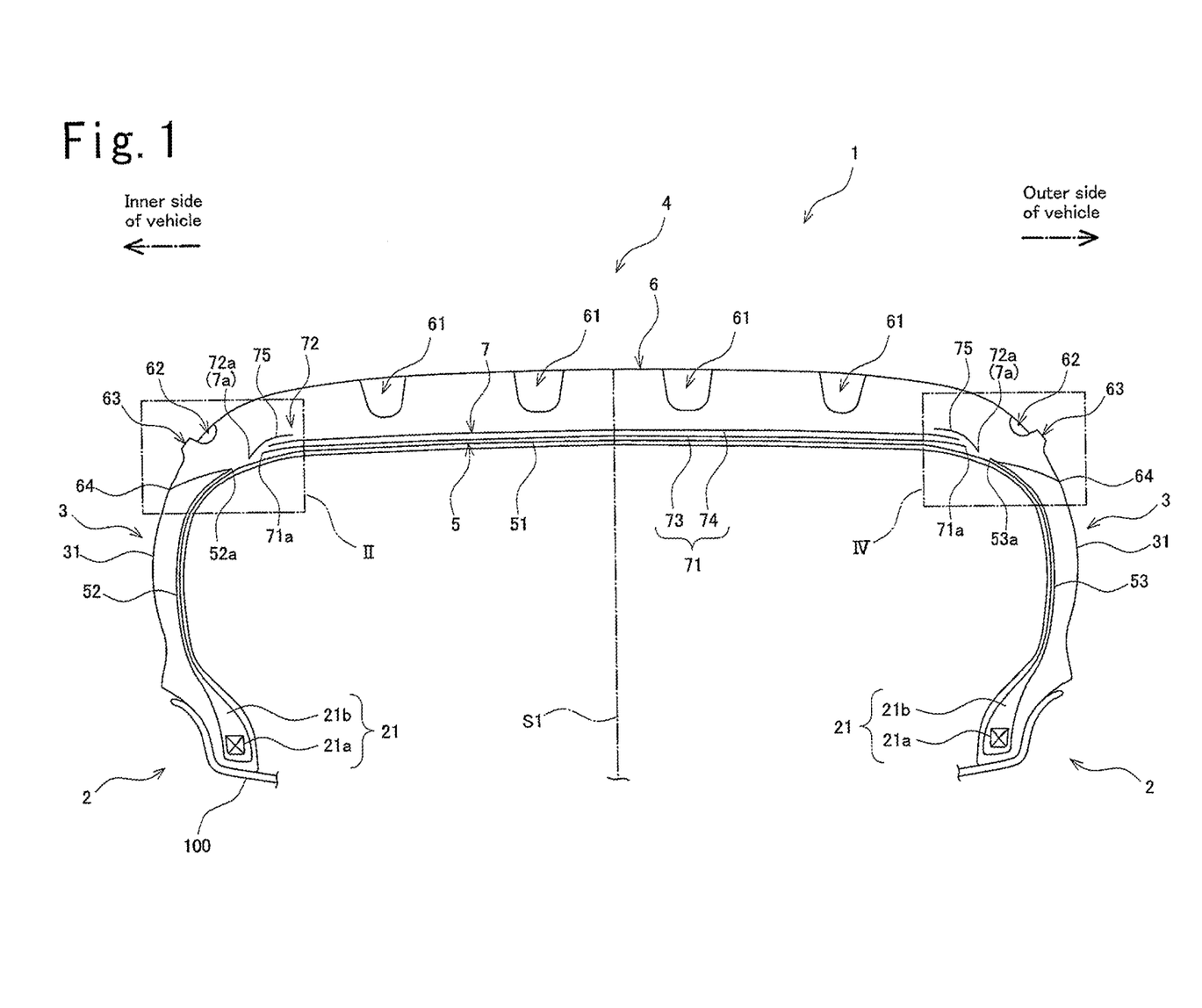
FIG. 1 is a cross-sectional view showing substantial parts of a pneumatic tire of one embodiment which is cut along a tire-radial direction.

As shown in FIG. 1, the pneumatic tire (also called simply "tire", hereinafter) 1 of the embodiment includes a pair of bead portions 2 and 2 each having a bead 21. The tire 1 also includes sidewall portions 3 and 3 extending from the bead portions 2 and 2 outward in a tire-radial direction, and a tread portion 4 which is connected to outer ends of the pair of sidewall portions 3 and 3 in the tire-radial direction and which configures a ground contact surface.

The tire 1 includes a carcass layer 5 which is bridged between the pair of beads 21 and 21. The carcass layer 5 is wound up from an inner side toward an outer side in a tire-width direction such that the carcass layer 5 envelops the beads 21. The tire 1 is mounted on a rim 100.

The tire 1 is asymmetric with respect to a tire equatorial plane S1 which is a virtual plane passing through a center of the tire-width direction. A mounting direction of the tire on a vehicle is designated. It is designated which one of left and right sides of the tire should be opposed to the vehicle when the tire 1 is mounted on the rim 100. A tread pattern formed in a tire-outer surface of the tread portion 4 may be symmetric or asymmetric with respect to the tire equatorial plane S1.

A mounting direction of the tire on the vehicle is shown by the sidewall portions 3 and 3. More specifically, to configure a tire-outer surface, each of the sidewall portions 3 and 3 includes a sidewall rubber 31 placed on an outer side of the carcass layer 5 in the tire-width direction, and a surface of the sidewall rubber 31 is provided with a display portion.

In this embodiment, a display meaning an inner side of a vehicle (e.g., "INSIDE" or the like) is shown on one of the sidewall portions 3 and 3 placed on the inner side (left side in FIG. 1, and also called "vehicle-inner side", hereinafter) when the tire is mounted on the vehicle, and a display meaning an outer side of the vehicle (e.g., "OUTSIDE" or the like) is shown on the other sidewall portion 3 placed on the outer side (right side in FIG. 1, and also called "vehicle-outer side", hereinafter) when the tire is mounted on the vehicle.

Each of the beads 21 and 21 includes an annularly formed bead core 21a and a bead filler 21b placed on the outer side of the bead core 21a in the tire-radial direction. The bead 21 is annularly formed. For example, the bead core 21a is formed by coating a bundle of wires such as a copper wire with rubber, and the bead filler 21b is formed by tapering hard rubber outward in the tire-radial direction.

To configure a ground contact surface (tread surface) which comes into contact with a ground surface, the tread portion 4 includes a tread rubber 6 placed on an outer peripheral side of the carcass layer 5. The tread portion 4 includes a belt portion 7 placed on the outer peripheral side of the carcass layer 5 and on an inner peripheral side of the tread rubber 6.

The tread rubber 6 includes a plurality of main grooves 61 extending along the tire-peripheral direction. The tread rubber 6 includes recessed portions 62 extending along the tire-peripheral direction. The tread rubber 6 also includes projecting portions 63 which are respectively adjacent to outer sides of the recessed portions 62 in the tire-width direction and which extend along the tire-peripheral direction.

The recessed portions 62 and the projecting portions 63 are placed on the outer sides of the tread rubber 6 in the tire-width direction. More specifically, each of the recessed portions 62 and each of the projecting portions 63 are placed on the outer side in the tire-width direction than one of the main grooves 61 which is placed on the outermost side in the tire-width direction. The recessed portions 62 and the projecting portions 63 are placed, one each, in the outer side regions of the tread rubber 6 in the tire-width direction. The pair of recessed portions 62 and the pair of projecting portions 63 are placed symmetrically with respect to the tire equatorial plane S1.

To reinforce the carcass layer 5, the belt portion 7 includes a belt layer 71 placed on the outer peripheral side of the carcass layer 5. To reinforce the belt layer 71, the belt portion 7 includes belt-reinforcing layers 72 placed between the tread rubber 6 and the belt layer 71. That is, the belt-reinforcing layers 72 are placed on the outer peripheral side of the carcass layer 5 and on the inner peripheral side of the tread rubber 6.

The belt layer 71 is composed of at least two belt plies (two belt plies in this embodiment) 73 and 74. The belt plies 73 and 74 are laminated on each other such that cords placed at a predetermined inclination angle (e.g., 15° to 35°) with respect to the tire-peripheral direction intersect with each other in opposite directions between two belt plies 73 and 74.

Each of the belt-reinforcing layers 72 includes a cord and a topping rubber coating the cord. The belt-reinforcing layer 72 is placed on the outer peripheral side of the belt layer 71 such that it covers the belt layer 71 in the tire-width direction. In this embodiment, the belt-reinforcing layer 72 includes edge-reinforcing portions 75 placed such that they are superposed on ends 71a of the belt layer 71.

Each of the ends 7a of the belt portion 7 means an outermost position of the belt plies 73 and 74 of the belt layer 71 and the reinforcing portion 75 of the belt-reinforcing layer 72 in the tire-width direction. In this embodiment, each of ends 7a of the belt portion 7 is an end 72a of the belt-reinforcing layer 72. More specifically, the end 7a is an outer end of the edge-reinforcing portion 75 in the tire-width direction.

Each of the ends 71a of the belt layer 71 means an outermost position of the belt plies 73 and 74 in the tire-width direction. Each of the ends 72a of the belt-reinforcing layers 72 means an outermost position of the reinforcing portion 75 in the tire-width direction. In this embodiment, the end 71a of the belt layer 71 is an end of the belt ply 73 placed on the inner side in the tire-radial direction, and the end 72a of the belt-reinforcing layer 72 is an outer end of the edge-reinforcing portion 75 in the tire-width direction.

The carcass layer 5 includes a main body 51 bridged between the pair of beads 21 and 21. The carcass layer 5 includes an inner wound-up portion 52 which is placed on the inner side when the tire is mounted on the vehicle and which is wound up from the inner side toward the outer side in the tire-width direction around the bead 21. The carcass layer 5 also includes an outer wound-up portion 53 which is placed on the outer side when the tire is mounted on the vehicle and which is wound up from the inner side toward the outer side in the tire-width direction around the bead 21.

In this embodiment, the carcass layer 5 is composed of one carcass ply. The carcass ply is formed by coating, with a topping rubber, a ply cord (e.g., a steel cord and an organic fiber cord) arranged in a direction intersecting with the tire-peripheral direction substantially at right angles.

As shown in FIGS. 1 to 5, the carcass layer 5 is placed such that the outer wound-up portion 53 is closer to the belt portion 7 than the inner wound-up portion 52. That is, an end 53a of the outer wound-up portion 53 is closer to the end 7a of the belt portion 7 than an end 52a of the inner wound-up portion 52. The end 53a of the outer wound-up portion 53 is placed on the outer side than the end 52a of the inner wound-up portion 52 in the tire-radial direction.

Each of the recessed portions 62 is placed at a position of the tire-outer surface located on the outer side in the tire-width direction than the tire-outer surface which is superposed on each of the ends 7a of the belt portion 7. That is, the recessed portion 62 is placed such that it is not superposed on the edge-reinforcing portion 75 in the normal direction of the tire-outer surface.

Figure 3:
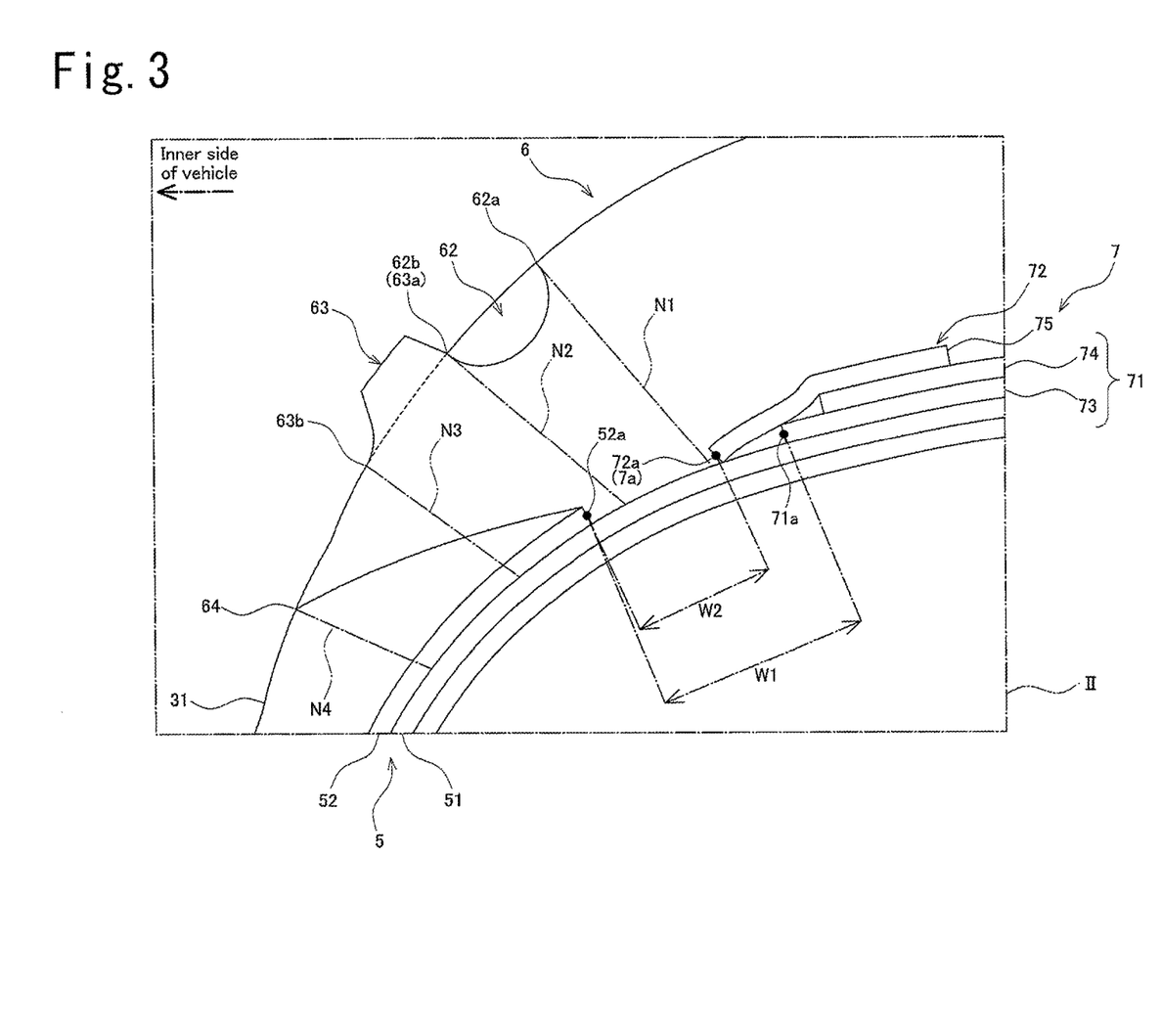
FIG. 3 is an enlarged view of the region II in FIG. 1 of the pneumatic tire of the embodiment and is a view for describing a position of an inner wound-up end.
Figure 5:
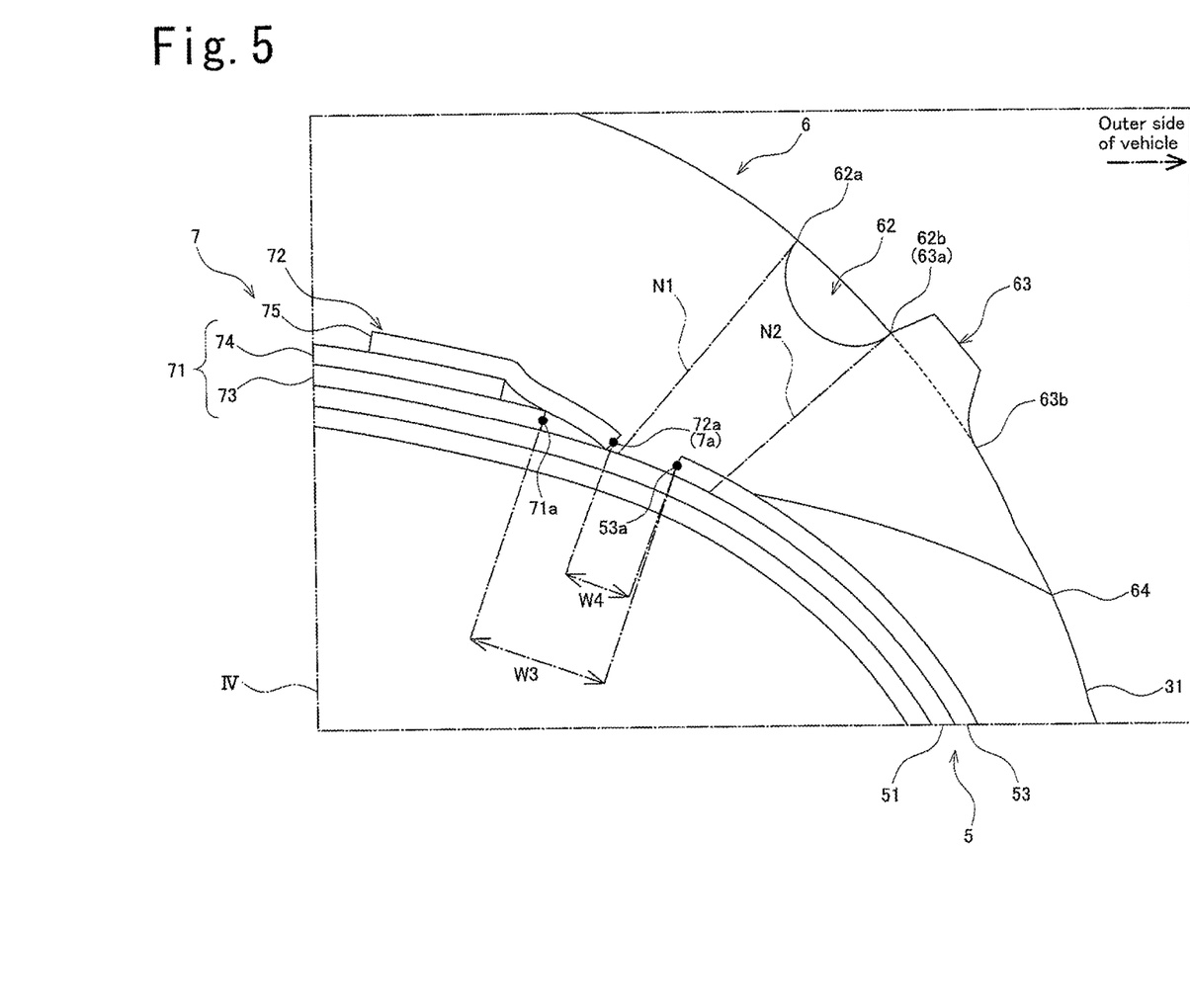
FIG. 5 is an enlarged view of the region IV in FIG. 1 of the pneumatic tire of the embodiment and is a view for describing a position of an outer wound-up end.

In FIGS. 3 and 5 (likewise in FIGS. 6 to 12), a dashed-dotted line N1 shows a normal of the tire-outer surface in an inner end 62a of the recessed portion 62 in the tire-width direction, and a dashed-dotted line N2 shows a normal of the tire-outer surface in an outer end 62b of the recessed portion 62 in the tire-width direction. A normal direction of the tire-outer surface is a normal direction with respect to an imaginary curved line (dotted lines in FIGS. 3 and 5) formed by smoothening irregularities provided on the tire-outer surface.

Figure 2:
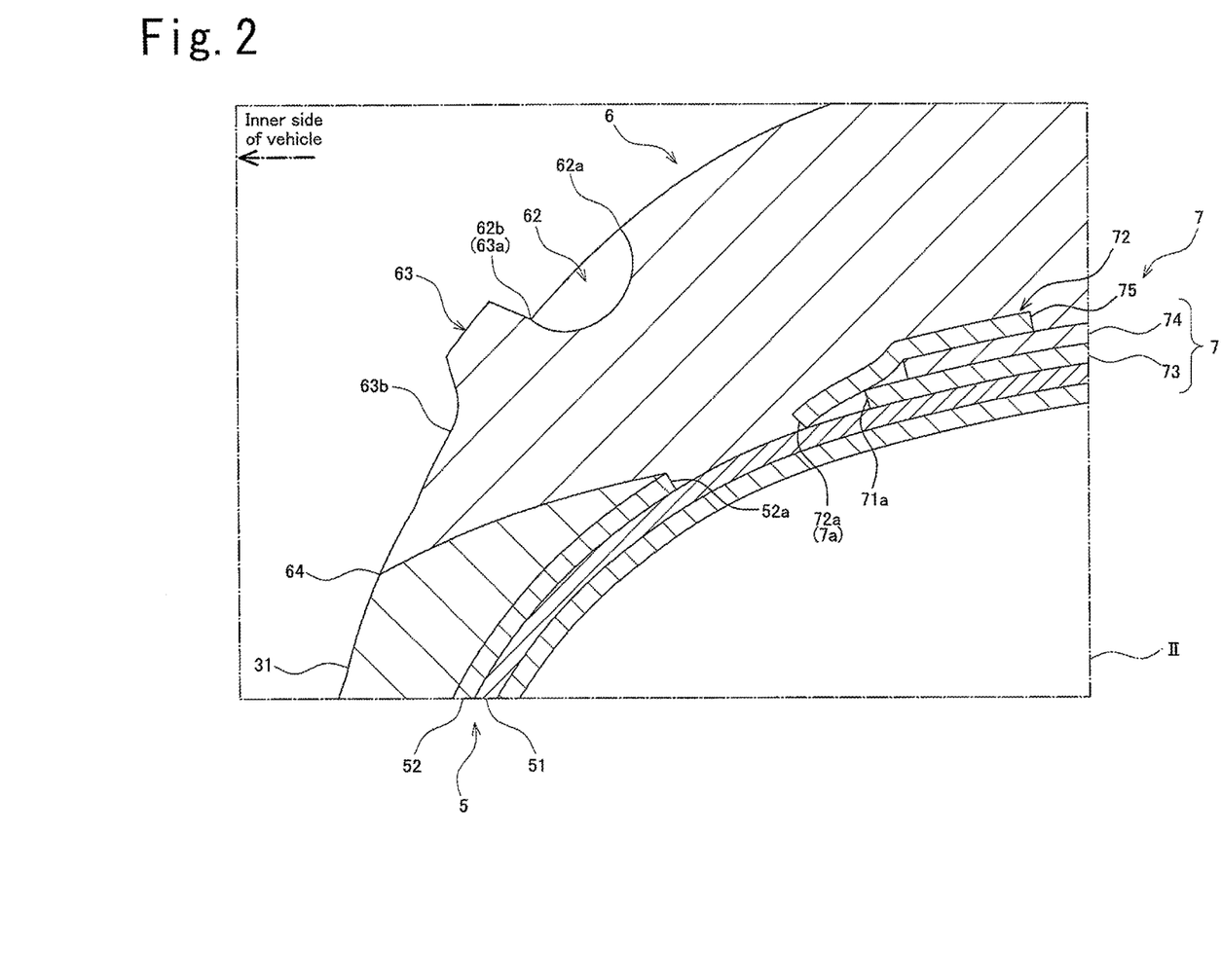
FIG. 2 is an enlarged view of a region II in FIG. 1 of the pneumatic tire of the embodiment.

As shown in FIGS. 2 and 3, the inner wound-up portion 52 is placed such that the end 52a is located between the outer end 62b of the recessed portion 62 in the tire-width direction and the outer end 64 of the tread rubber 6 in the tire-width direction. This configuration prevents the inner wound-up portion 52 from being superposed on the recessed portion 62 in the normal direction of the tire-outer surface (the inner wound-up portion 52 is not superposed on the recessed portion 62), and on the other hand, in the normal direction of the tire-outer surface, the inner wound-up portion 52 is superposed on the outer end 64 of the tread rubber 6 in the tire-width direction.

The inner wound-up portion 52 is placed such that it is superposed on the projecting portion 63 in the normal direction of the tire-outer surface. More specifically, the inner wound-up portion 52 is placed such that the end 52a is located between an inner end 63a and an outer end 63b of the projecting portion 63 in the tire-width direction.

Here, in FIG. 3 (likewise in FIGS. 6 to 8 and FIGS. 11 and 12), a dashed-dotted line N3 shows a normal of the tire-outer surface in the outer end 63b of the projecting portion 63 in the tire-width direction, and a dashed-dotted line N4 shows a normal of the tire-outer surface in the outer end 64 of the tread rubber 6 in the tire-width direction.

In this embodiment, the inner end 63a of the projecting portion 63 in the tire-width direction matches with the outer end 62b of the recessed portion 62 in the tire-width direction. According to this, a normal of the tire-outer surface of the inner end 63a of the projecting portion 63 in the tire-width direction is the same as a normal of the tire-outer surface of the outer end 62b of the recessed portion 62 in the tire-width direction, and is the dashed-dotted line N3 in FIG. 3 (likewise in FIGS. 6 to 8 and FIGS. 11 and 12).

Like the tire 1 of this embodiment, when the end 72a of each of the belt-reinforcing layers 72 is placed on the outer side in the tire-width direction than an end 71a of the each of the belt layers 71, it is preferable that the end 52a of the inner wound-up portion 52, the end 71a of the belt layer 71, and the end 72a of the belt-reinforcing layer 72 are placed at predetermined positions. More specifically, it is preferable that the following relation is established.

$$W2 \geq W1 \times 60\%$$

Where, W1 represents a straight line distance between the end 52a of the inner wound-up portion 52 and the end 71a of the belt layer 71, and W2 represents a straight line distance between the end 52a of the inner wound-up portion 52 and the end 72a of the belt-reinforcing layer 72.

Figure 4:
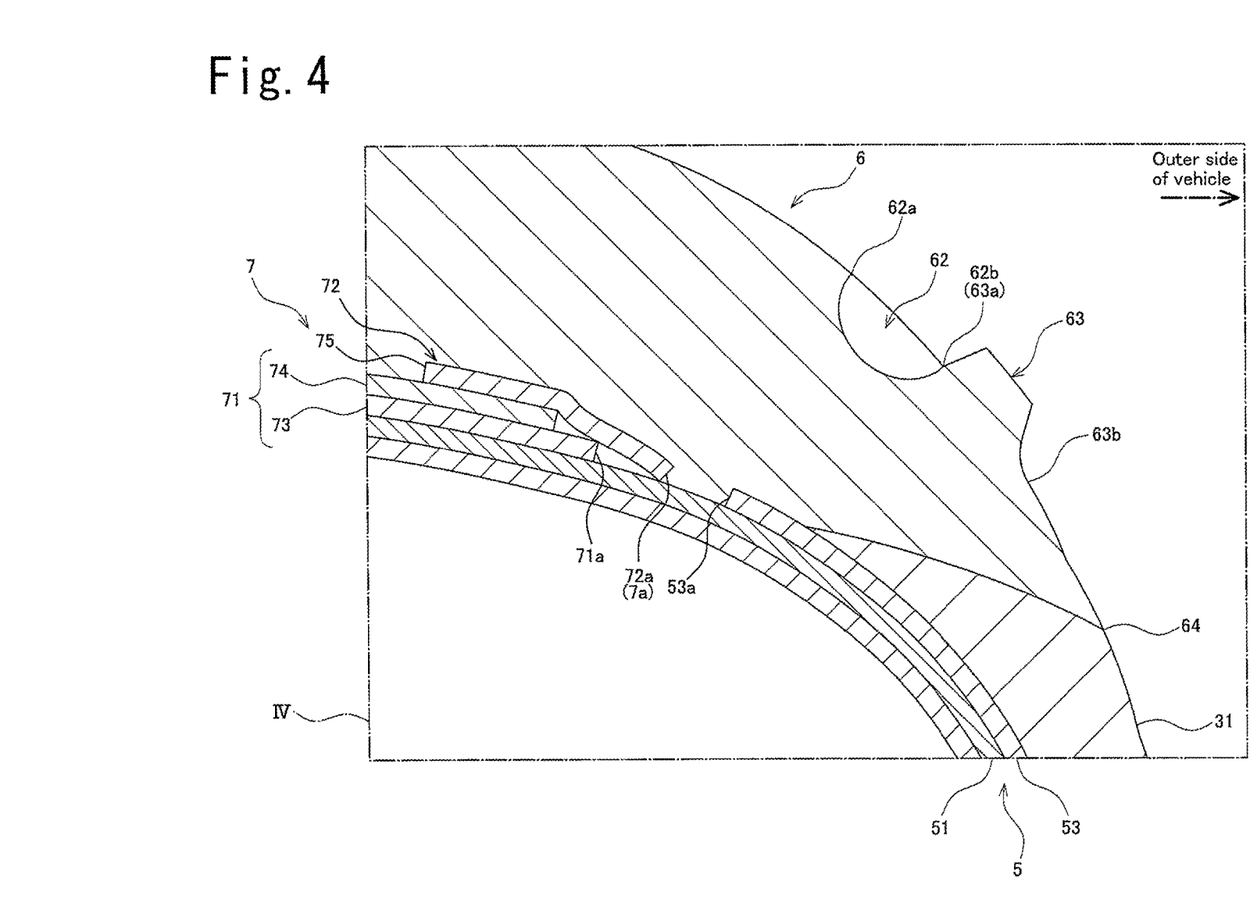
FIG. 4 is an enlarged view of a region IV in FIG. 1 of the pneumatic tire of the embodiment.

As shown in FIGS. 4 and 5, the outer wound-up portion 53 is separated from the belt portion 7. This arrangement prevents the outer wound-up portion 53 from being superposed on the belt portion 7 in the normal direction of the tire-outer surface (the outer wound-up portion 53 is not superposed on the belt portion 7). The outer wound-up portion 53 is superposed on the recessed portion 62 in the normal direction of the tire surface. More specifically, the outer wound-up portion 53 is placed such that the end 53a is located between the inner end 62a and the outer end 62b of the recessed portion 62 in the tire-width direction.

When the end 72a of the belt-reinforcing layer 72 is placed on the outer side in the tire-width direction than the end 71a of the belt layer 71 like the tire 1 of this embodiment, it is preferable that the end 53a of the outer wound-up portion 53, the end 71a of the belt layer 71, and the end 72a of the belt-reinforcing layer 72 are placed at predetermined positions. More specifically, it is preferable that the following relation is established.

$$W4 \leq W3 \times 50\%$$

Where, W3 represents a straight line distance between the end 53a of the outer wound-up portion 53 and the end 71a of the belt layer 71, and W4 represents a straight line distance between the end 53a of the outer wound-up portion 53 and the end 72a of the belt-reinforcing layer 72.

Thus, according to the tire 1 of this embodiment, the tread rubber 6 includes the recessed portions 62 extending along the tire-circumferential direction. Each of the recessed portions 62 is located at the position of the tire-outer surfaces located on the outer side in the tire-width direction than the tire-outer surface superposed on each of the ends 7a of the belt portion 7. This configuration reduces strength in the vicinity of the recessed portions 62 of the tread portion 4.

Therefore, when the tire 1 climbs over a small projection on a road surface for example, vibrations and the like are easily absorbed since the tire 1 easily deforms and bends around the recessed portions 62. As a result, since envelope characteristics can be enhanced, ride comfort performance can be enhanced.

According to the tire 1 of the embodiment, the outer wound-up portion 53 is placed closer to the belt portion 7 than the inner wound-up portion 52. According to this, since rigidity of the inner side portion when the tire is mounted on the vehicle becomes low, the ride comfort performance can be enhanced, and since rigidity of the outer side portion when the tire is mounted on the vehicle becomes high, the steering stability performance can be enhanced.

According to the tire 1 of the embodiment, since the outer wound-up portion 53 is separated from the belt portion 7, the outer wound-up portion 53 is prevented from being superposed on the belt portion 7. This configuration can prevent vibrations and the like of the belt portion 7 from propagating directly to the outer wound-up portion 53. Therefore, the ride comfort performance can be enhanced.

According to the tire 1 of the embodiment, the outer wound-up portion 53 is superposed on the recessed portion 62. This configuration prevents rigidity of the recessed portion 62 placed on the outer side when the tire is mounted on the vehicle from lowering more than necessary. Therefore, the steering stability performance can be enhanced.

According to the tire 1 of the embodiment, the inner wound-up portion 52 is placed between the outer end 64 of the tread rubber 6 in the tire-width direction and the outer end 62b of the recessed portion 62 in the tire-width direction. This arrangement prevents the inner wound-up portion 52 from being superposed on the recessed portion 62. Accordingly, rigidity of the recessed portion 62 is prevented from increasing. Therefore, the ride comfort performance is prevented from being deteriorated.

A force is applied to the inner side portion (when the tire is mounted on the vehicle) of the inner wheel during cornering. On the other hand, since the inner wound-up portion 52 is superposed on the outer ends 64 of the tread rubber 6 in the tire-width direction, rigidity of the inner side portion when the tire is mounted on the vehicle is prevented from lowering more than necessary. This can inhibit the steering stability performance from being deteriorated.

According to the tire 1 of the embodiment, the tread rubber 6 includes the projecting portions 63 which are adjacent to the outer sides of the recessed portions 62 in the tire-width direction and which extend in the tire-circumferential direction. According to this, since the strength of the projecting portions 63 is large, the recessed portions 62 easily deform and bend more than necessary (easily bend and deform), for example. On the other hand, since the inner wound-up portion 52 is superposed on the projecting portions 63, the recessed portions 62 are inhibited from deforming more than necessary.

The pneumatic tire is not limited to the configuration of the embodiment described above, and the effects are not limited to those described above. It goes without saying that the pneumatic tire can be variously modified without departing from the scope of the subject matter of the present invention. Not to mention, the configurations and methods or the like according to various modification examples described below, for example, may be freely selected and adopted to the configurations or methods of the embodiment described above.

In the pneumatic tire 1 of the embodiment, the carcass layer 5 is composed of the one carcass ply. However, the pneumatic tire 1 is not limited to this configuration. In the pneumatic tire 1, the carcass layer 5 may be composed of a plurality of carcass plies for example.

In such a configuration, the outer wound-up portion 53 which extends to the outermost side in the tire-radial direction (such a portion will be called "longest outer wound-up portion", hereinafter) is placed closer to the belt portion 7 than the inner wound-up portion 52 which extends to the outermost side in the tire-radial direction (such a portion will be called "longest inner wound-up portion", hereinafter). The longest outer wound-up portion 53 is separated from the belt portion 7 to prevent the longest outer wound-up portion 53 from being superposed on the belt portion 7, and the longest outer wound-up portion 53 is superposed on the recessed portions 62.

In such a configuration, it is preferable that the end 52a is located between the outer end 62b of the recessed portion 62 in the tire-width direction and the outer end 64 of the tread rubber 6 in the tire-width direction, to prevent the longest inner wound-up portion 52 from being superposed on the recessed portions 62 and to make the longest inner wound-up portion 52 be superposed on the outer end 64 of the tread rubber 6 in the tire-width direction.

In the pneumatic tire 1 of the embodiment, the tread rubber 6 includes the recessed portions 62 one each in each of the outer regions in the tire-width direction. However, the pneumatic tire is not limited to this configuration. For example, in the pneumatic tire, the tread rubber 6 may include a plurality of recessed portions 62 in each of the outer regions in the tire-width direction.

In such a configuration, the outer wound-up portion 53 is superposed on at least predetermined one of the plurality of recessed portions 62. When a recessed portion 62 located on the tire-outer surface which is superposed on the end 7a of the belt portion 7 exists, the predetermined recessed portion 62 is this recessed portion, and when such a recessed portion 62 does not exist, the predetermined recessed portion 62 is one which is the closest to the former position of the tire-outer surface, on the outer side tire-outer surface in the tire-width direction.

In such a configuration, it is preferable that the end 52a is located between the outer end 62b of the predetermined recessed portion 62 in the tire-width direction and the outer end 64 of the tread rubber 6 in the tire-width direction, to prevent the inner wound-up portion 52 from being superposed on the predetermined recessed portion 62.

In the pneumatic tire 1 of the embodiment, the inner wound-up portion 52 is placed such that it is prevented from being superposed on the recessed portions 62. However, the pneumatic tire is not limited to this configuration. In the pneumatic tire, the inner wound-up portion 52 may be placed such that it is superposed on the recessed portions 62 for example. In short, in the pneumatic tire, it is only necessary that the outer wound-up portion 53 is closer to the belt portion 7 than the inner wound-up portion 52.

In the pneumatic tire 1 of the embodiment, the belt portion 7 includes the belt layers 71 and the belt-reinforcing layers 72. However, the pneumatic tire is not limited to this configuration. In the pneumatic tire, the belt portion 7 may include only the belt layers 71 and may not include the belt-reinforcing layers 72.

EXAMPLE

Figure 13:
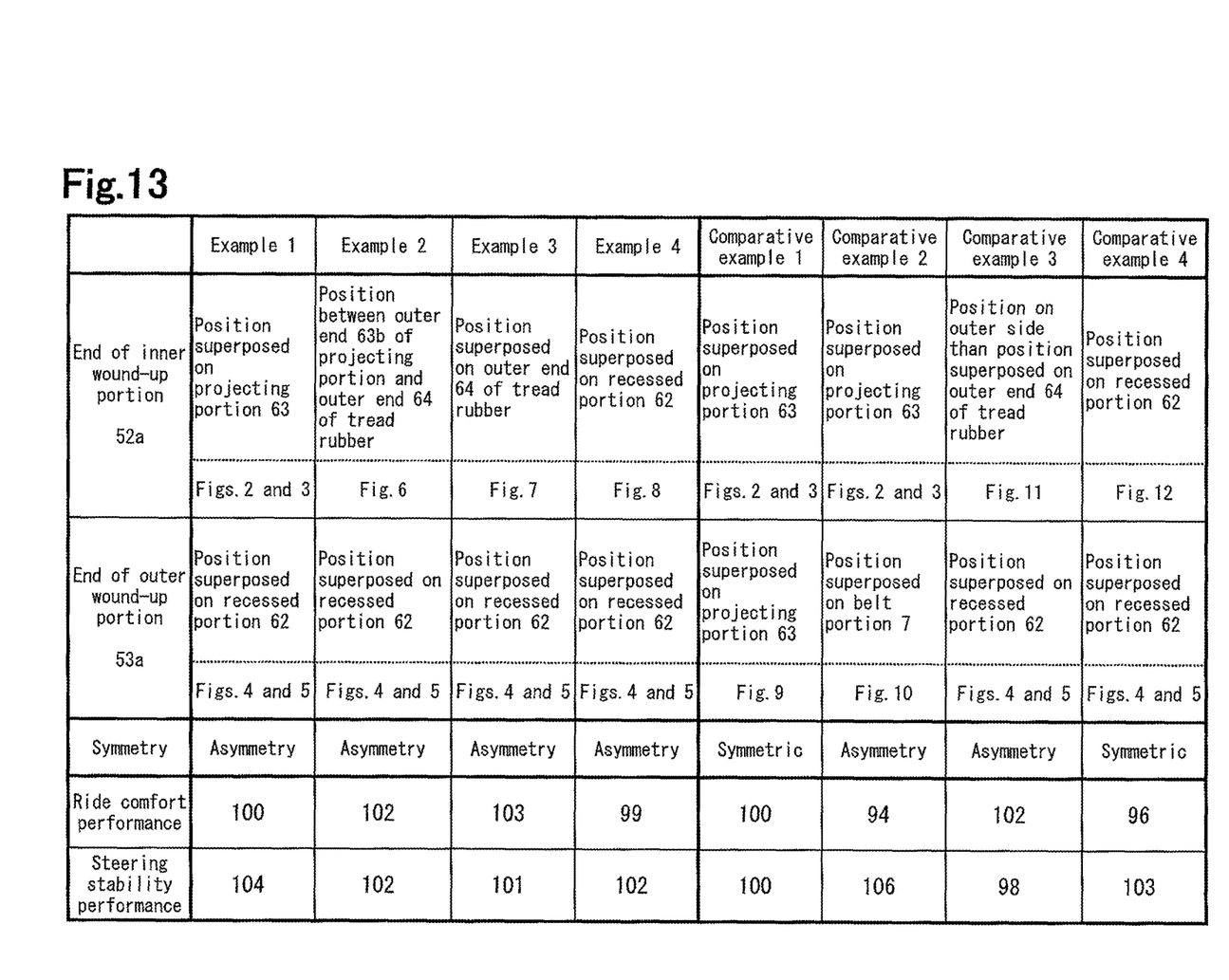
FIG. 13 is an evaluation table between examples and comparative examples.

To specifically show the configurations and effects of the present invention, examples of the pneumatic tire and its comparative examples will be described below with reference to FIG. 13.

<Ride Comfort Performance>

Tires each having a size of 195/65R15 were mounted on a vehicle, and straight running was performed on a dry road surface. Steering stability performance was evaluated by a driver's sensory test. A result of a comparative example 1 was evaluated based on indices of 100, and the evaluation shows that the greater the indices were, the more excellent the ride comfort performance was.

<Steering Stability Performance>

Tires each having a size of 195/65R15 were mounted on a vehicle, and cornering was performed on a dry road surface. The steering stability performance was evaluated by a driver's sensory test. A result of a comparative example 1 was evaluated based on indices of 100, and the evaluation shows that the greater the indices were, the more excellent the steering stability performance was.

Examples 1 to 4

An example 1 shows a tire of the embodiment shown in FIGS. 1 to 5. More specifically, the end 52a of the inner wound-up portion 52 is placed at a position superposed on the projecting portion 63 as shown in FIGS. 2 and 3, and the end 53a of the outer wound-up portion 53 is placed at a position superposed on the recessed portion 62 as shown in FIGS. 4 and 5.

Figure 6:
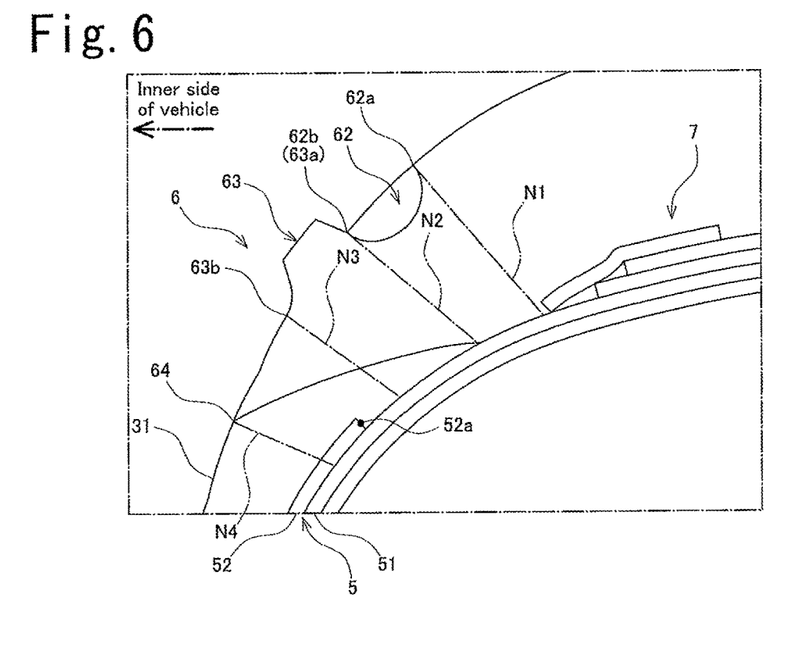
FIG. 6 is an enlarged view showing substantial parts of a pneumatic tire of another embodiment and is a view for describing a position of an inner wound-up end.

An example 2 shows a tire in which a position of the end 52a of the inner wound-up portion 52 is changed with respect to the tire of the example 1. More specifically, as shown in FIG. 6, the end 52a of the inner wound-up portion 52 of the example 2 is placed between the outer end 63b of the projecting portion 63 and the outer end 64 of the tread rubber 6.

Figure 7:
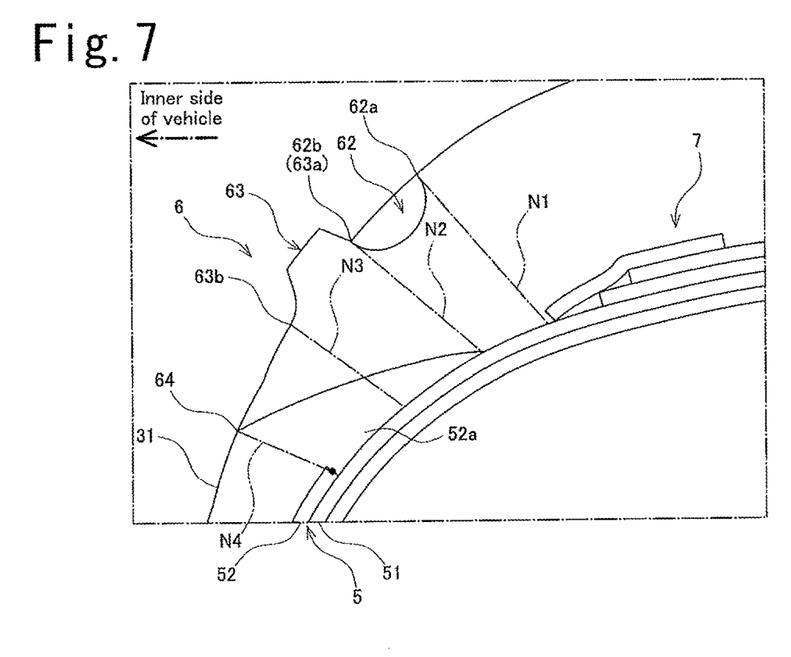
FIG. 7 is an enlarged view showing substantial parts of a pneumatic tire of still another embodiment and is a view for describing a position of an inner wound-up end.

An example 3 shows a tire in which a position of the end 52a of the inner wound-up portion 52 is changed with respect to the tire of the example 1. More specifically, the end 52a of the inner wound-up portion 52 of the example 3 is placed at a position superposed on the outer end 64 of the tread rubber 6 as shown in FIG. 7.

Figure 8:
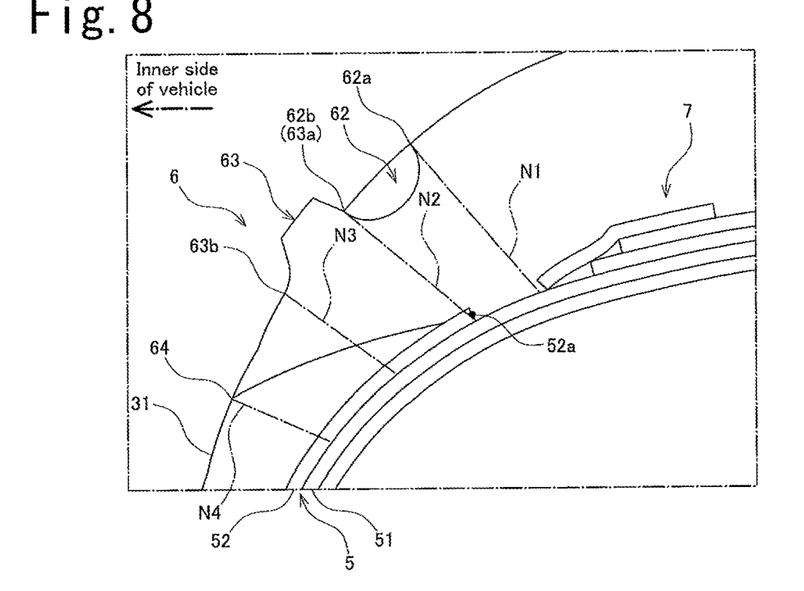
FIG. 8 is an enlarged view showing substantial parts of a pneumatic tire of yet another embodiment and is a view for describing a position of an inner wound-up end.

An example 4 shows a tire in which a position of the end 52a of the inner wound-up portion 52 is changed with respect to the tire of the example 1. More specifically, the end 52a of the inner wound-up portion 52 of the example 4 is placed at a position superposed on the recessed portion 62, and is placed at an asymmetric position with respect to the end 53a of the outer wound-up portion 53 so that the outer wound-up portion 53 is closer to the belt portion 7 than the inner wound-up portion 52 as shown in FIG. 8.

Comparative Examples 1 to 4

Figure 9:
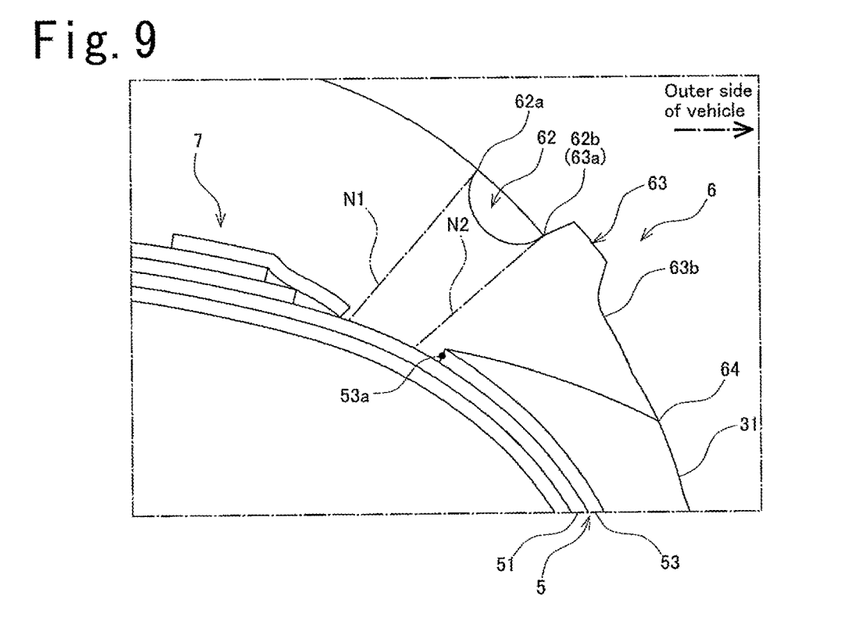
FIG. 9 is an enlarged view showing substantial parts of a pneumatic tire of a comparative example and is a view for describing a position of an outer wound-up end.

A comparative example 1 shows a tire in which a position of the end 53a of the outer wound-up portion 53 is changed with respect to the tire of the example 1. More specifically, the end 53a of the outer wound-up portion 53 of the comparative example 1 is placed at a position superposed on the projecting portion 63, and is placed such that a distance between the outer wound-up portion 53 and the belt portion 7 is equal to a distance between the inner wound-up portion 52 and the belt portion 7 as shown in FIG. 9.

Figure 10:
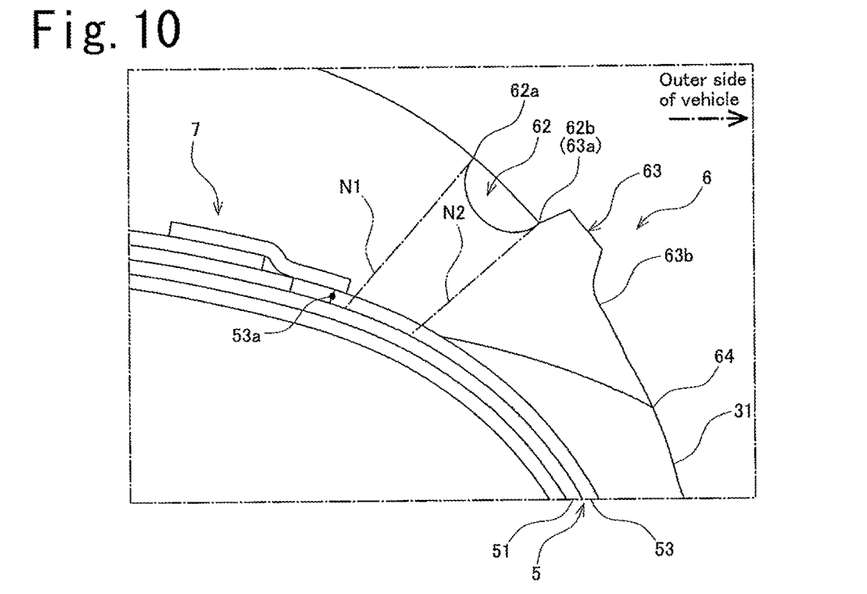
FIG. 10 is an enlarged view showing substantial parts of a pneumatic tire of another comparative example and is a view for describing a position of an outer wound-up end.

A comparative example 2 shows a tire in which a position of the end 53a of the outer wound-up portion 53 is changed with respect to the tire of the example 1. More specifically, the end 53a of the outer wound-up portion 53 of the comparative example 2 is placed at a position superposed on the belt portion 7 as shown in FIG. 10.

Figure 11:
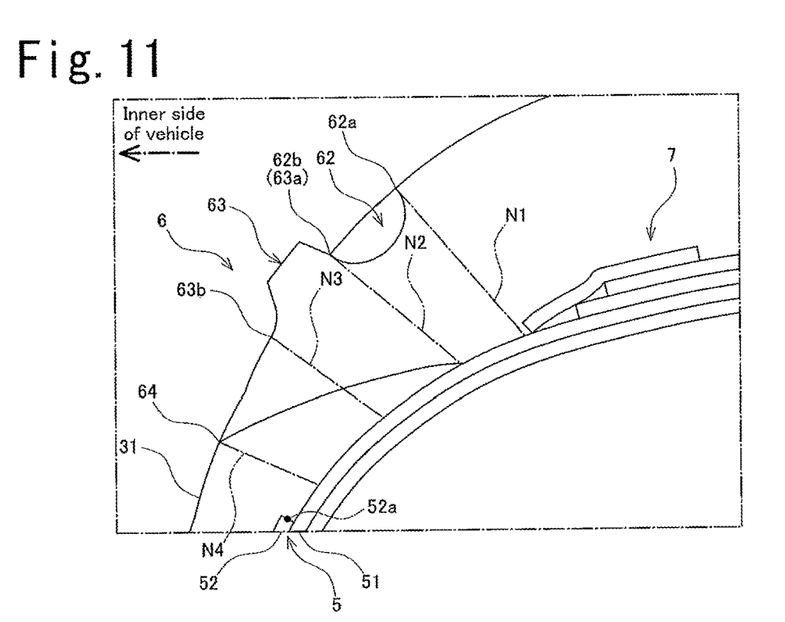
FIG. 11 is an enlarged view showing substantial parts of a pneumatic tire of still another comparative example and is a view for describing a position of an inner wound-up end.

A comparative example 3 shows a tire in which a position of the end 52a of the inner wound-up portion 52 is changed with respect to the tire of the example 1. More specifically, the end 52a of the inner wound-up portion 52 of the comparative example 3 is placed on the outer side in the tire-width direction than a position where the end 52a is superposed on the outer end 64 of the tread rubber 6 as shown in FIG. 11.

Figure 12:
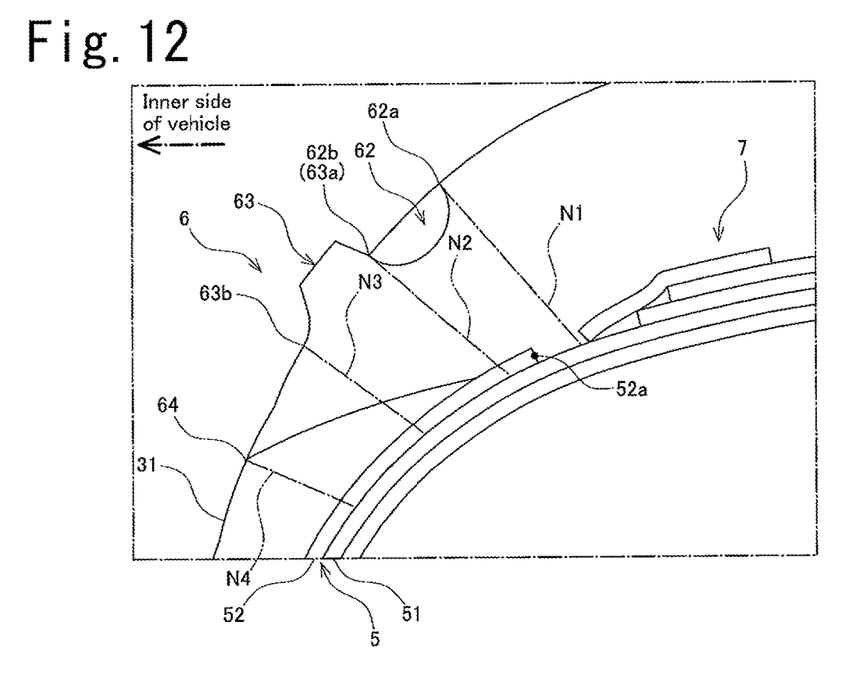
FIG. 12 is an enlarged view showing substantial parts of a pneumatic tire of yet another comparative example and is a view for describing a position of an inner wound-up end.

A comparative example 4 shows a tire in which a position of the end 52a of the inner wound-up portion 52 is changed with respect to the tire of the example 1. More specifically, the end 52a of the inner wound-up portion 52 of the comparative example 4 is placed at a position superposed on the recessed portion 62, and is placed at a position symmetric with respect to the end 53a of the outer wound-up portion 53 so that a distance between the outer wound-up portion 53 and the belt portion 7 is equal to a distance between the inner wound-up portion 52 and the belt portion 7 as shown in FIG. 12.

<Results of Evaluations>

In the comparative examples 1 and 3, the steering stability performance is not enhanced. In the comparative examples 2 and 4, although the steering stability performance is enhanced, ride comfort performance is deteriorated. In the examples 1 to 3, on the other hand, the steering stability performance is enhanced without deteriorating the ride comfort performance.

More preferable examples of the tire will be described below.

First, in the tires of the examples 1 to 3, the end 52*a* of the inner wound-up portion 52 is not superposed on the recessed portion 62. In the tire of the example 4 on the other hand, the end 52*a* of the inner wound-up portion 52 is superposed on the recessed portion 62.

In the tires of the examples 1 to 3, the steering stability performance can be enhanced without deteriorating the ride comfort performance. One the other hand, in the tire of the example 4, the steering stability performance can be enhanced but the ride comfort performance is slightly deteriorated. According to this, in the tires, it is preferable that the end 52*a* is placed between the outer end 62*b* of the recessed portion 62 in the tire-width direction and the outer end 64 of the tread rubber 6 in the tire-width direction, to prevent the inner wound-up portion 52 from being superposed on the recessed portion 62 and to make the inner wound-up portion 52 be superposed on the outer end 64 of the tread rubber 6 in the tire-width direction.

In the tire of the example 1, the end 52*a* of the inner wound-up portion 52 is superposed on the projecting portion 63. On the other hand, in the tires of the examples 2 and 3, the end 52*a* of the inner wound-up portion 52 is not superposed on the projecting portion 63.

In the tire of the example 1, the ride comfort performance is maintained and the steering stability performance is effectively enhanced. On the other hand, in the tires of the examples 2 and 3, although the ride comfort performance can be enhanced, the steering stability performance cannot be enhanced so much as compared with the example 1. According to this, in the tires, it is preferable that the inner wound-up portion 52 is placed such that it is adjacent to the outer side of the recessed portion 62 in the tire-width direction and such that the inner wound-up portion 52 is superposed on the projecting portion 63 which extends along the tire-circumferential direction.

REFERENCE SIGNS LIST

1: pneumatic tire
2: bead portion
3: sidewall portion
4: tread portion
5: carcass layer
6: tread rubber
7: belt portion
7*a*: end
21: bead
21*a*: bead core
21*b*: bead filler
31: sidewall rubber
51: main body
52: inner wound-up portion
52*a*: end
53: outer wound-up portion
53*a*: end
61: main grooves
62: recessed portion
62*a*: inner end
62*b*: outer end
63: projecting portion
63*a*: inner end
63*b*: outer end
64: outer end
71: belt layer
71*a*: end
72: belt-reinforcing layer
72*a*: end
73: belt ply
74: belt ply
75: edge-reinforcing portion
100: rim
S1: tire equatorial plane

What is claimed is:

1. A pneumatic tire comprising:
a pair of beads formed annularly;
a carcass layer bridged between the pair of beads;
a tread rubber placed on an outer peripheral side of the carcass layer to configure a ground contact surface;
a belt portion placed on the outer peripheral side of the carcass layer and on an inner peripheral side of the tread rubber; and
a display portion indicating an intended mounting direction of the tire on a vehicle, wherein
the carcass layer includes an inner wound-up portion which is placed on an intended inner side as indicated by the display portion when the tire is mounted on a vehicle, and which is wound up from an inner side toward an outer side around the beads in a tire-width direction, and an outer wound-up portion which is placed on an outer side as indicated by the display portion when the tire is mounted on the vehicle, and which is wound up from the inner side toward the outer side around the beads in the tire-width direction,
the tread rubber includes a recessed portion extending along a tire-circumferential direction, the recessed portion being placed at a position of a tire-outer surface superposed on an end of the belt portion or at a position of a tire-outer surface on an outer side in a tire-width direction than the former position of the tire-outer surface,
the outer wound-up portion is placed closer to the belt portion than the inner wound-up portion, the outer wound-up portion is separated from the belt portion to prevent the outer wound-up portion from being superposed on the belt portion, and the outer wound-up portion is superposed on the recessed portion,
an end of the outer wound-up portion is located between a normal of the tire-outer surface in an inner end of the recessed portion in the tire-width direction and a normal of the tire-outer surface in an outer end of the recessed portion in the tire-width direction, wherein the inner wound-up portion is placed such that an end of the innerwound-up portion is located between a normal of the tire-outersurface in an outer end of the recessed portion in the tire-width direction and a normal of the tire-outersurface in the outer end of the tread rubber in the tire width direction, to prevent the innerwound-up portion from being superposed on the recessed portion and to make the innerwound-up portion be superposed on an outer end of the tread rubber in the tire-width direction.

2. The pneumatic tire according to claim 1, wherein
the tread rubber includes a projecting portion which is adjacent to an outer side of the recessed portion in the tire-width direction and which extends in the tire-circumferential direction, the inner wound-up portion is superposed on the projecting portion, and the end of the inner wound-up portion is located between said normal of the tire-outer surface of the inner end of the projecting portion in the tire-width direction and a normal of the tire-outer surface in the outer end of the projecting portion in the tire-width direction.

3. The pneumatic tire according to claim 2, wherein the pneumatic tire further comprises:

a sidewall rubber located on an outer side of the carcass layer in the tire-width direction, the end of the inner wound-up portion is located internally in the sidewall rubber, and the end of the outer wound-up portion is located internally in the tread rubber.

4. The pneumatic tire according to claim 3, wherein the projecting portion protrudes from a normal direction of the tire-outer surface.

5. The pneumatic tire according to claim 2, wherein the projecting portion protrudes from a normal direction of the tire-outer surface.

6. The pneumatic tire according to claim 1, wherein the pneumatic tire further comprises:

a sidewall rubber located on an outer side of the carcass layer in the tire-width direction, an end of the inner wound-up portion is located internally in the sidewall rubber, and the end of the outer wound-up portion is located internally in the tread rubber.

\* \* \* \* \*